(12) United States Patent
Kono et al.

(10) Patent No.: US 7,678,485 B2
(45) Date of Patent: Mar. 16, 2010

(54) FUEL CARTRIDGE, FUEL CELL AND PORTABLE ELECTRICAL APPLIANCE INCLUDING FUEL CELL

(75) Inventors: Yasutaka Kono, Tokyo (JP); Yoshimi Kubo, Tokyo (JP); Tsutomu Yoshitake, Tokyo (JP); Takashi Manako, Tokyo (JP); Hiroshi Kajitani, Tokyo (JP); Hidekazu Kimura, Tokyo (JP); Satoshi Nagao, Tokyo (JP); Eiji Akiyama, Tokyo (JP); Yoshinori Watanabe, Tokyo (JP)

(73) Assignee: NEC Corporation (JP)

( * ) Notice: Subject to any disclaimer, the term of this patent is extended or adjusted under 35 U.S.C. 154(b) by 148 days.

(21) Appl. No.: 10/596,275

(22) PCT Filed: Dec. 6, 2004

(86) PCT No.: PCT/JP2004/018151

§ 371 (c)(1),
(2), (4) Date: Jan. 3, 2007

(87) PCT Pub. No.: WO2005/057704

PCT Pub. Date: Jun. 23, 2005

(65) Prior Publication Data

US 2007/0099056 A1 May 3, 2007

(30) Foreign Application Priority Data

Dec. 9, 2003 (JP) .............................. 2003-411074

(51) Int. Cl.
*H01M 8/04* (2006.01)
(52) U.S. Cl. .............................. 429/34; 429/22; 429/30; 62/46.1; 62/50.5
(58) Field of Classification Search .................. 62/46.1, 62/50.5; 429/22, 34, 30
See application file for complete search history.

(56) References Cited

U.S. PATENT DOCUMENTS

| 4,562,123 A | 12/1985 | Shimizu et al. ............... 429/27 |
| 7,544,434 B2 | 9/2001 | Yamauchi et al. ............. 429/34 |
| 6,506,513 B1 | 1/2003 | Yonetsu et al. ................ 429/34 |

(Continued)

FOREIGN PATENT DOCUMENTS

EP 1087455 3/2001

(Continued)

OTHER PUBLICATIONS

Chinese Patent Office Action dated Jul. 1, 2009.

*Primary Examiner*—Dah-Wei D Yuan
*Assistant Examiner*—Patricia Davis
(74) *Attorney, Agent, or Firm*—Hayes Soloway P.C.

(57) ABSTRACT

The operability of a fuel cell which uses a fuel cartridge housing a liquid fuel is improved. A fuel cartridge 1400 houses a liquid fuel 124. The fuel cartridge 1400 includes a gas-liquid separation film 1408 which divides a fuel housing section 1402 into a liquid housing chamber 1402a and a gas housing chamber 1402b. A fuel gas, which is the vaporized liquid fuel, is housed in the gas housing chamber 1402b. A gas exhaust pipe 1410 is connected to the gas housing chamber 1402b, and the fuel gas housed in the gas housing chamber 1402b is discharged to outside the fuel cartridge 1400 via a gas discharge port 1414.

6 Claims, 12 Drawing Sheets

U.S. PATENT DOCUMENTS

| | | | |
|---|---|---|---|
| 2003/0082421 A1 | 5/2003 | Yonetsu et al. | 429/25 |
| 2003/0094002 A1* | 5/2003 | Hibino et al. | 62/46.1 |
| 2003/0124408 A1 | 7/2003 | Hojo et al. | 429/34 |
| 2004/0009381 A1 | 1/2004 | Sakai et al. | 429/23 |
| 2004/0013928 A1* | 1/2004 | Yamauchi et al. | 429/34 |
| 2004/0209133 A1* | 10/2004 | Hirsch et al. | 429/22 |

FOREIGN PATENT DOCUMENTS

| | | |
|---|---|---|
| EP | 1324415 | 2/2003 |
| JP | 60-62064 | 4/1985 |
| JP | 2001-93551 | 4/2001 |
| JP | 2003-92128 | 3/2003 |
| JP | 2003-223920 | 8/2003 |
| JP | 2003-257466 | 9/2003 |
| JP | 2003/297401 | 10/2003 |
| JP | 2003-346862 | 12/2003 |
| JP | 2004-152741 | 5/2004 |
| JP | 2004-234971 | 8/2004 |
| JP | 2004-281341 | 10/2004 |
| JP | 2005-11695 | 1/2005 |

* cited by examiner

F I G. 1(a)
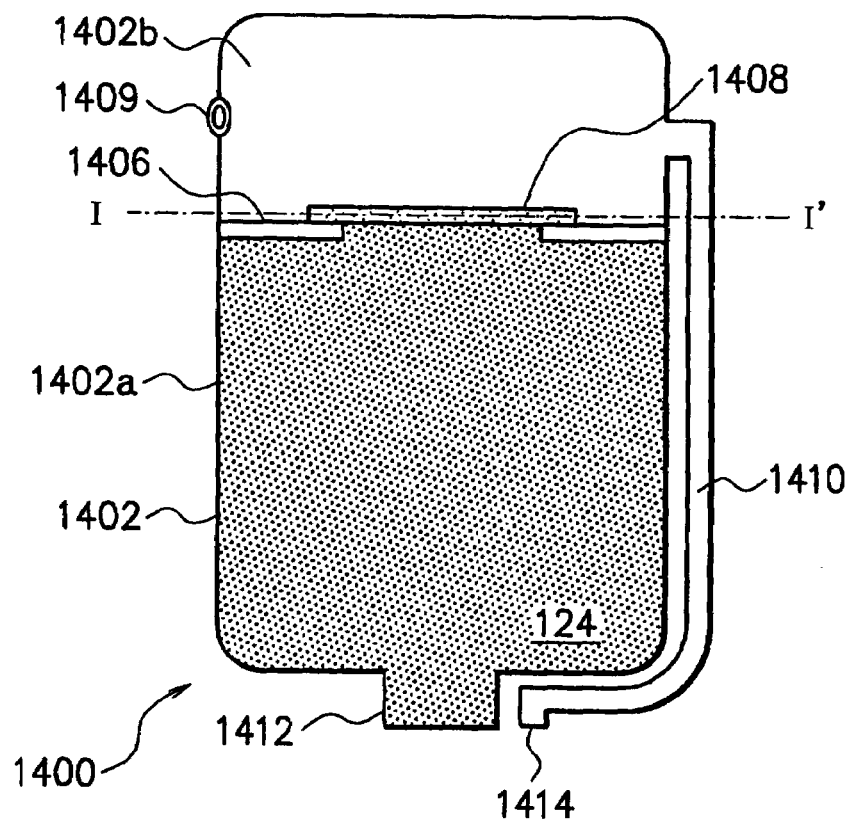
F I G. 1(b)
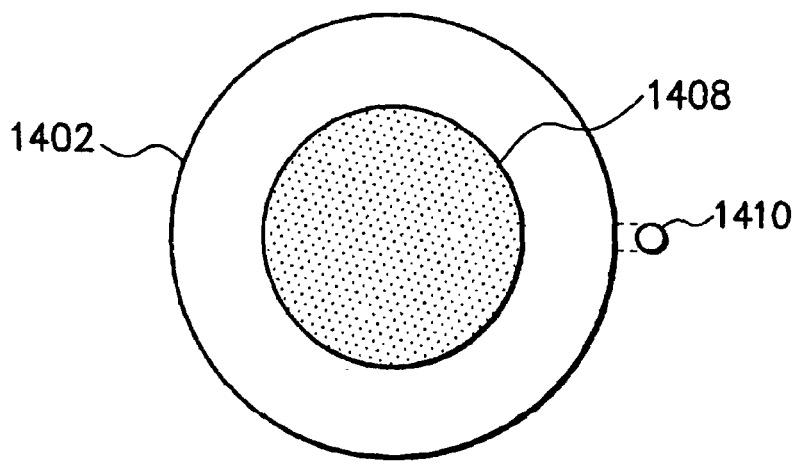

F I G. 2
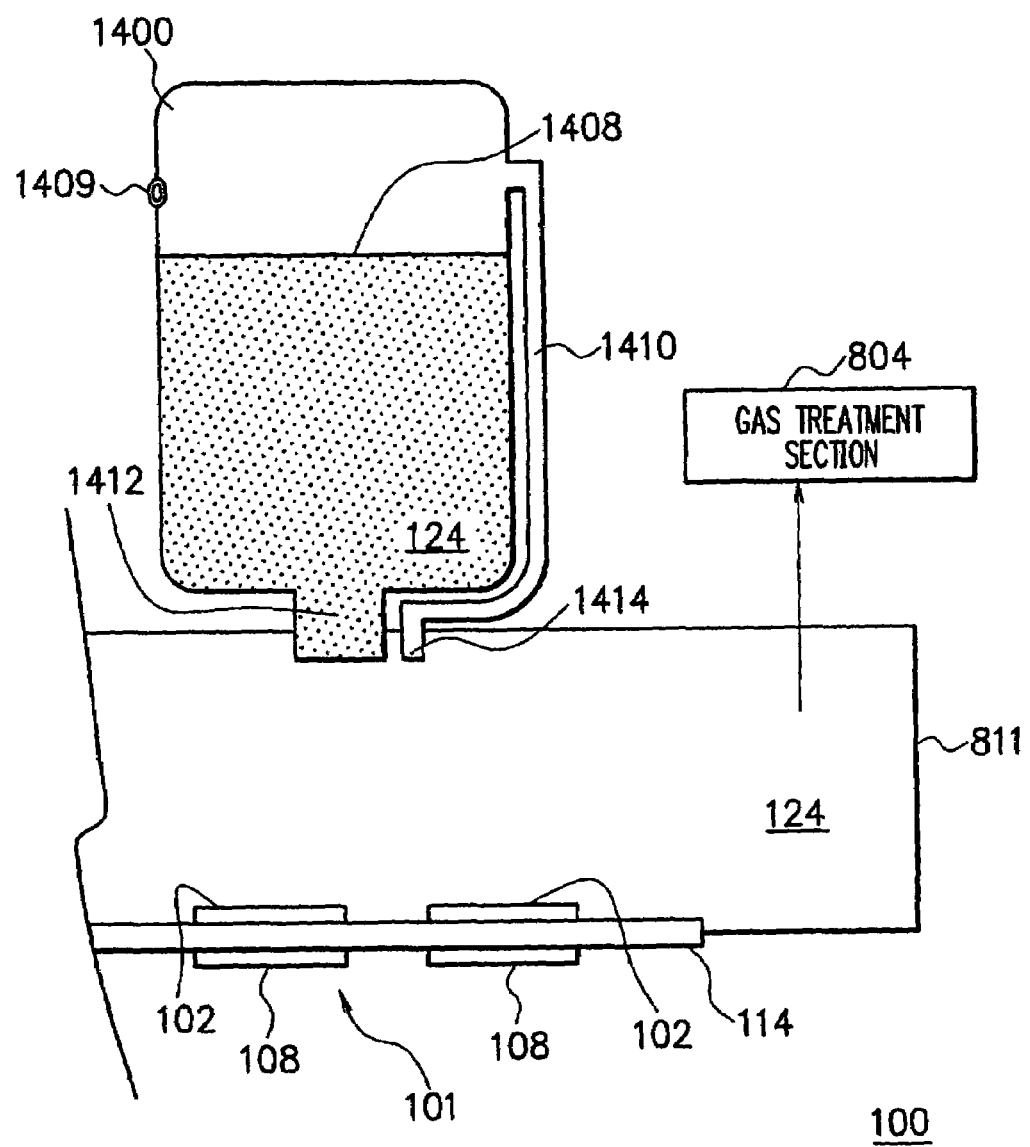

F I G. 5
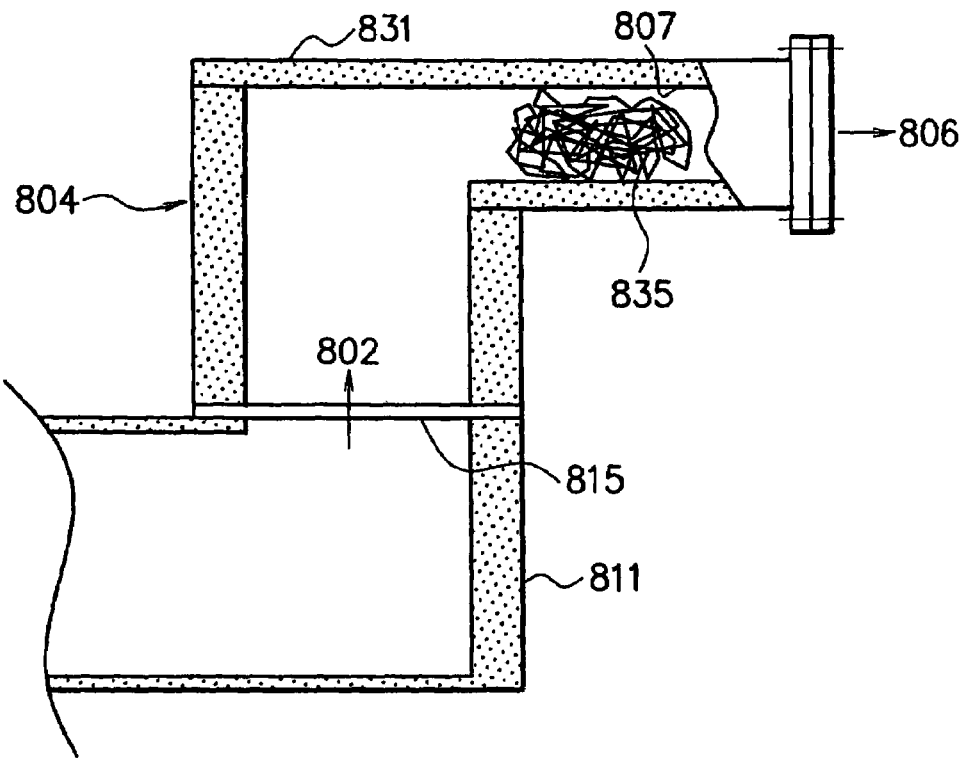
F I G. 6
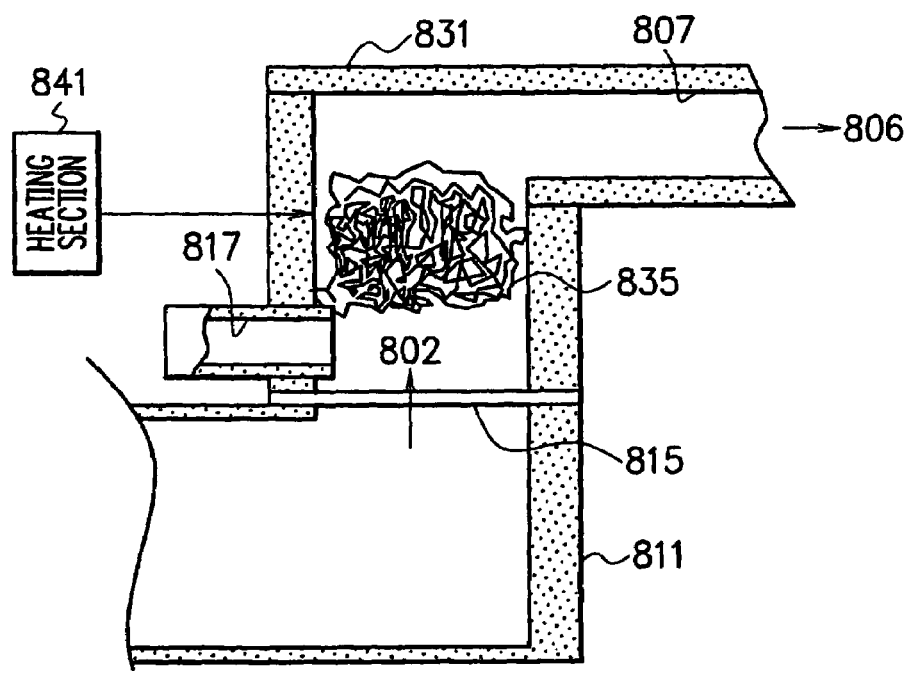

F I G. 7
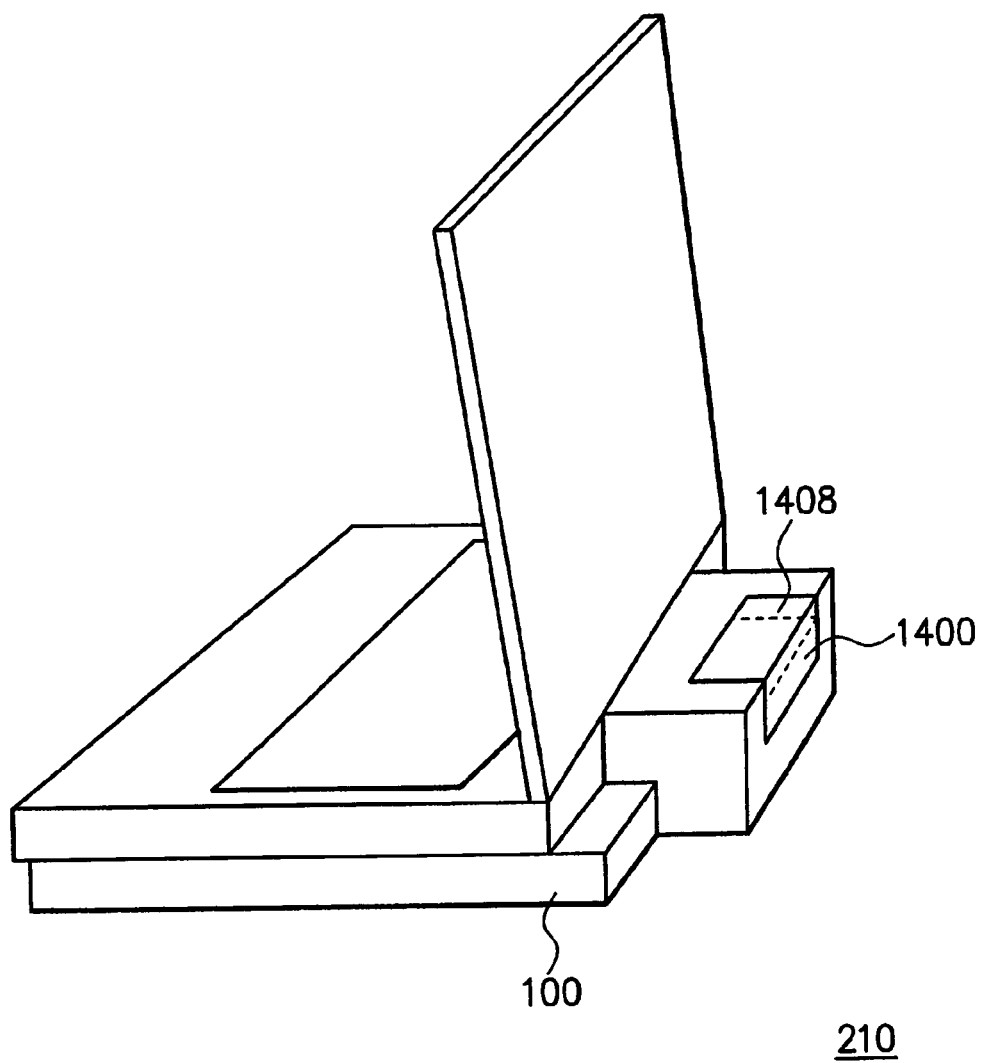

F I G. 10 (a)
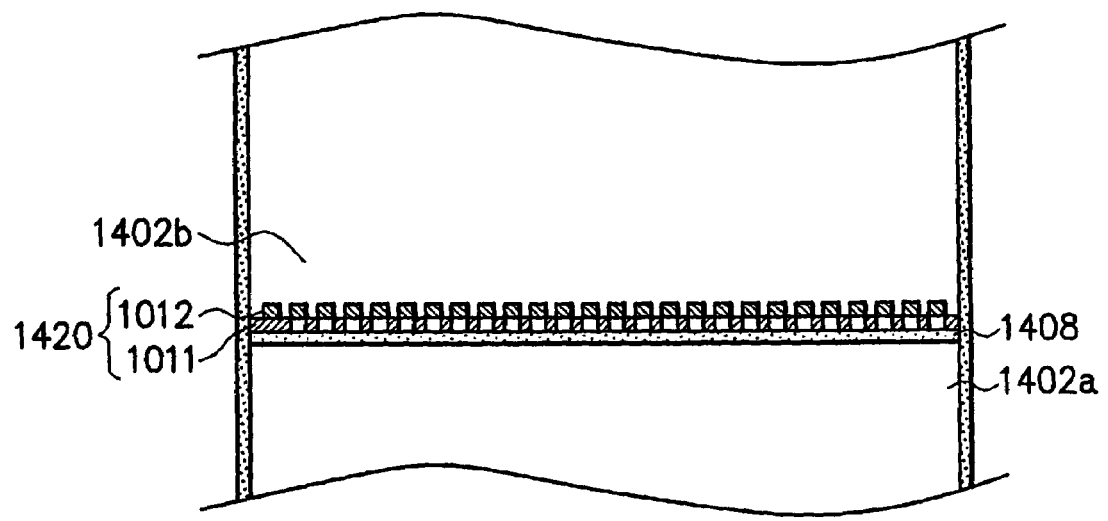
F I G. 10 (b)
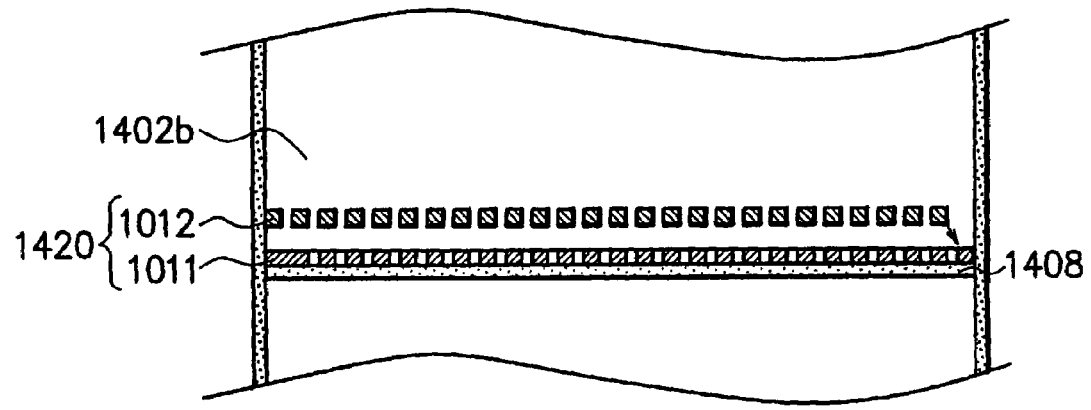

F I G. 11(a)
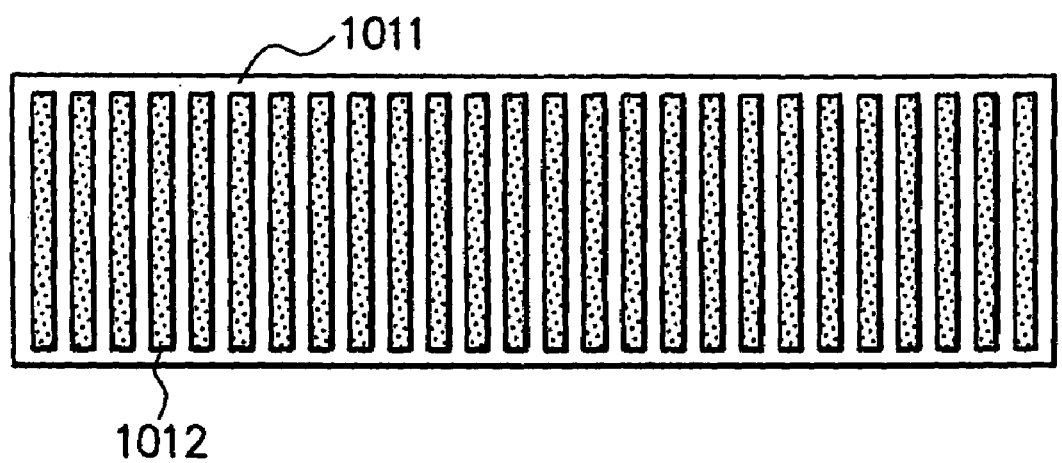
F I G. 11(b)
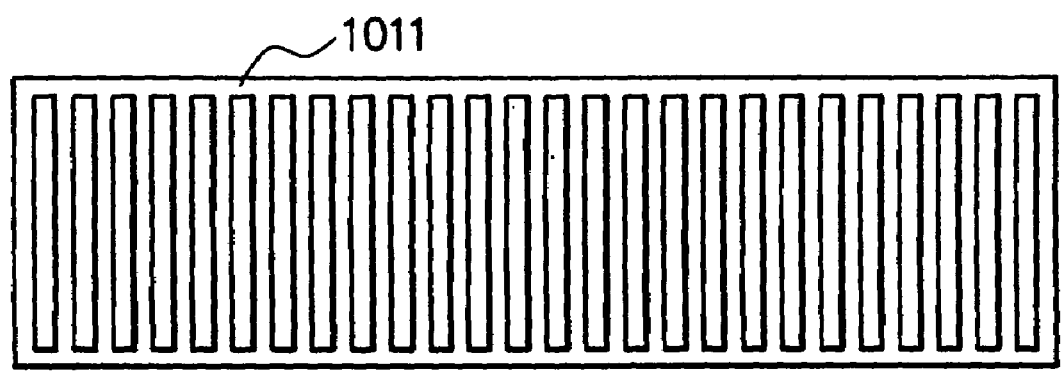

F I G. 13 (a)
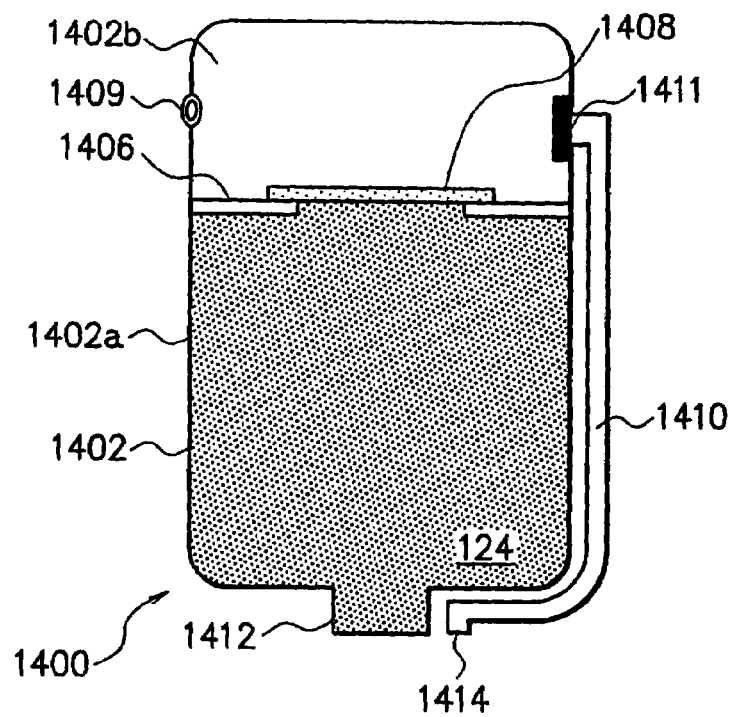
F I G. 13 (b)
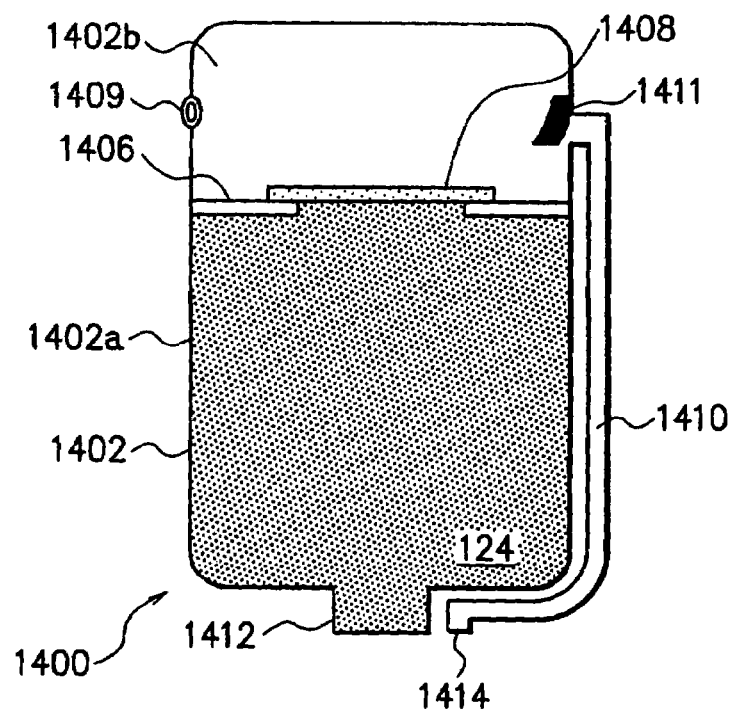

F I G. 14 (a)
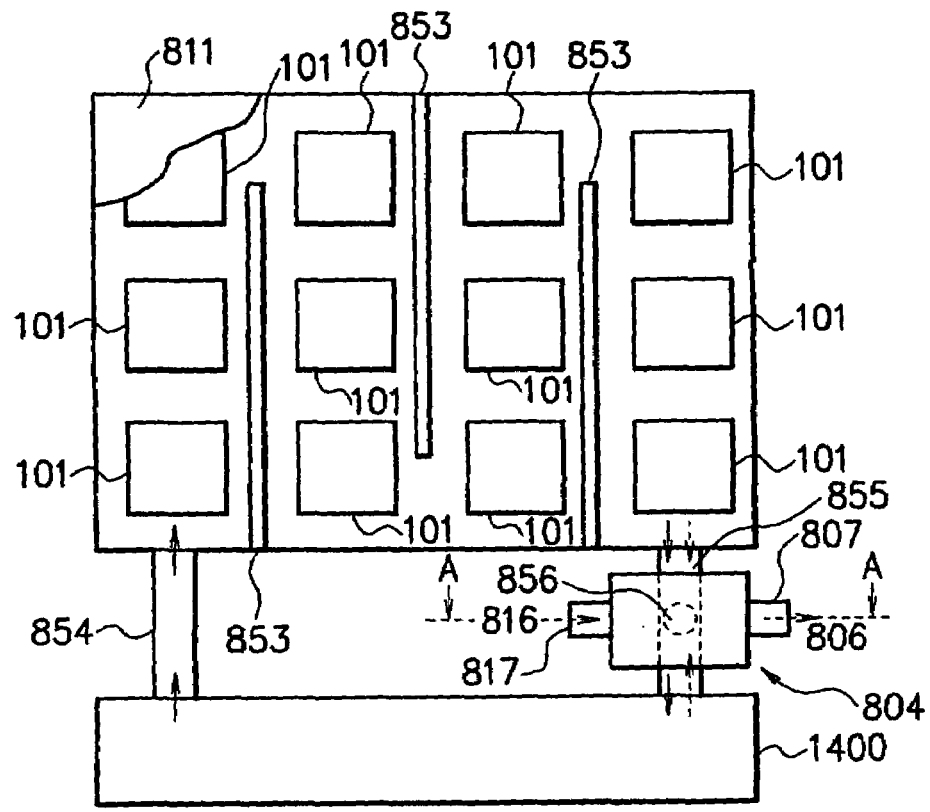
F I G. 14(b)
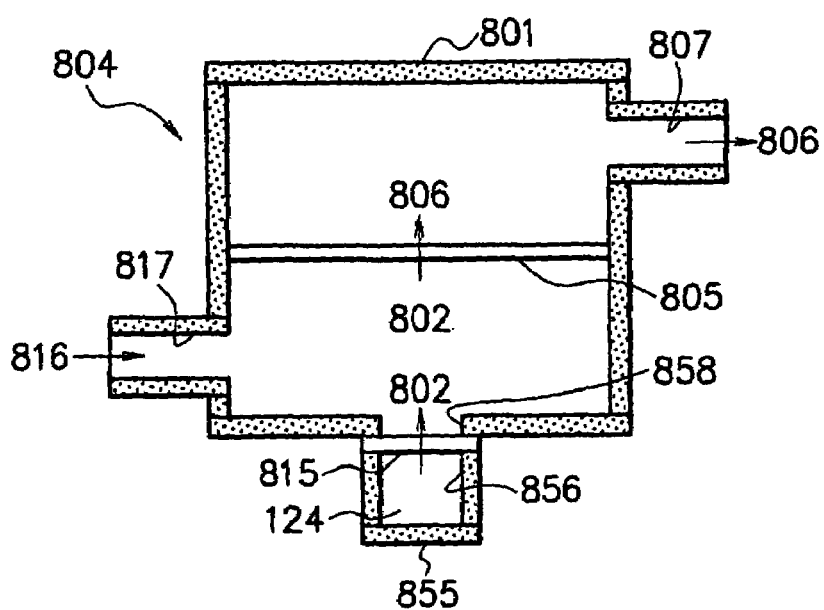

FUEL CARTRIDGE, FUEL CELL AND PORTABLE ELECTRICAL APPLIANCE INCLUDING FUEL CELL

TECHNICAL FIELD

The present invention relates to a fuel cartridge, a fuel cell to which the fuel cartridge is mounted, and a portable electrical appliance including the fuel cell.

BACKGROUND ART

A fuel cell consists of a fuel electrode, an oxidizer electrode and electrolyte provided between them. Fuel is supplied to the fuel electrode, an oxidizer is supplied to the oxidizer electrode, and the fuel cell generates power by electrochemical reactions. Although hydrogen is generally used as a fuel, active development of direct type fuel cells has been seen recent years. The direct type fuel cells directly use methanol as a fuel, which is inexpensive and easy to handle.

When hydrogen is used as a fuel, the reaction at the fuel electrode is given by Formula (1):

$$3H_2 \rightarrow 6H^+ + 6e^-. \qquad (1)$$

When methanol is used as a fuel, the reaction at the fuel electrode is given by Formula (2):

$$CH_3OH + H_2O \rightarrow 6H^+ + CO_2 + 6e^-. \qquad (2)$$

In both cases, the reaction at the oxidizer electrode is given by Formula (3):

$$3/2 O_2 + 6H^+ + 6e^- \rightarrow 3H_2O. \qquad (3)$$

Japanese Patent Application Laid-Open No. 2003-92128 (Patent Document 1) discloses an example in which when a fuel cell is used as a power source of a portable electronic appliance, a fuel cartridge is used for supplying fuel to the fuel cell.

DISCLOSURE OF THE INVENTION

Problems to be Solved by the Invention

As described above, a fuel cartridge that is detachable from a fuel cell has come to be used. However, if the temperature of a fuel cartridge that houses liquid fuel rises, the liquid fuel vaporizes and expands. Consequently, the pressure in the fuel cartridge rises, thereby posing a problem. This gives rise to the problem that it is impossible to control the amount of fuel that is supplied from the fuel cartridge to the main body of the fuel cell to an appropriate level. In particular, when a fuel cell is used as a power source of a portable electrical appliance, the fuel cell is used in various environments and, therefore, changes in the ambient temperature have a great effect on the fuel cell. Also, when fuel is supplied from the fuel cartridge to the main body of the fuel cell via a pump, the pump receives load if the amount of the fuel discharged from the fuel cartridge cannot be controlled, thereby posing a problem.

The present invention has been made in view of the above circumstances and the invention relates to a technique for improving the operability of a fuel cell that uses a fuel cartridge housing liquid fuel.

Means for Solving the Problems

The present invention provides a fuel cartridge that houses a liquid fuel, comprising a gas-liquid separation film that separates the liquid fuel and fuel gas, which is vaporized liquid fuel, from each other.

Because the fuel cartridge is provided with this gas-liquid separation film, the liquid fuel is isolated by the gas-liquid separation film. Consequently, even when a suction port leading to the outside is provided on the side where the fuel gas is separated, it is possible to prevent the liquid fuel from leaking to the outside. The fuel cartridge is fixed to the fuel cell or detachably mounted thereto.

The fuel cartridge of the present invention may further comprise a gas housing chamber that houses the fuel gas separated by the gas-liquid separation film. By adopting this construction, it is possible to house the fuel gas in the fuel housing chamber and to prevent the fuel gas separated from the liquid fuel from being discharged to the air.

The fuel cartridge of the present invention may further comprise a shutter that adjusts a degree of exposure of the gas-liquid separation film.

By providing this shutter and adjusting the opening of the shutter, it is possible to adjust the degree of exposure of the gas-air separation film based on the temperature around the fuel cartridge and the gas-liquid separation film and hence it is possible to keep the pressure in the fuel cartridge at an appropriate level.

The fuel cartridge of the present invention may further comprise a discharge port that discharges the fuel gas separated by the gas-liquid separation film to the outside of the fuel cartridge. As a result, it is possible to keep the pressure in the fuel cartridge at an appropriate level.

The fuel cartridge of the present invention may further comprise a discharged amount adjusting mechanism that adjusts an amount of the fuel gas discharged from the discharge port. As a result, it is possible to keep the pressure in the fuel cartridge at an appropriate level based on the temperature around the fuel cartridge.

The present invention provides a fuel cell, which comprises a fuel cartridge that houses liquid fuel, a recovery section that recovers fuel gas, which is the vaporized liquid fuel, the fuel gas being housed in the fuel cartridge, and a discharged amount control section that controls an amount of the fuel gas discharged from the fuel cartridge to the recovery section.

By providing this construction, it is possible to keep the pressure in the fuel cartridge at an appropriate level.

The fuel cell of the present invention may further comprise a discharge passage that discharges the fuel gas recovered to the recovery section to the air, and an oxidizing treatment section that is provided in the discharge passage and oxidizes the fuel gas.

As a result, it is possible to discharge by-products formed by the fuel gas and electrochemical reactions to the air after the oxidation and thus the influence on the environment is reduced.

In the fuel cell of the present invention, the fuel cartridge may comprise a gas-liquid separation film that separates the liquid fuel and the fuel gas from each other, and the fuel cartridge is adapted to recover the fuel gas separated by the gas-liquid separation film to the recovery section.

As a result, it is possible to separately control an amount of the liquid fuel housed in the fuel cartridge and of the fuel gas discharged from the fuel cartridge.

The present invention provides a fuel cell that comprises a fuel cartridge that houses liquid fuel and is provided with a gas-liquid separation film that separates the liquid fuel and fuel gas, which is the vaporized liquid fuel, from each other, a recovery section that recovers the fuel gas separated by the gas-liquid separation film in the fuel cartridge, a discharge passage that discharges the fuel gas recovered in the recovery section to the air, and an oxidizing treatment section that is provided in the discharge passage and oxidizes the fuel gas.

In the fuel cell of the present invention, the fuel cartridge can be any one of the above-described fuel cartridges.

In the fuel cell of the present invention, the fuel cartridge may be detachably mounted.

The present invention provides a portable electrical appliance that includes any one of the above fuel cells.

The present invention provides a method of operating a fuel cell that uses a fuel cartridge housing liquid fuel, wherein fuel gas is discharged from the fuel cartridge via a gas-liquid separation film, the fuel gas being the vaporized liquid fuel.

According to the present invention, in a fuel cell that uses a fuel cartridge housing liquid fuel, it is possible to separate a fuel gas, which is the vaporized liquid fuel, from the liquid fuel and to discharge the fuel gas from the fuel cartridge by adjusting the fuel gas and, therefore, the operability of the fuel cell can be improved.

BRIEF DESCRIPTION OF THE DRAWINGS

FIGS. 1(a) and 1(b) are diagrams that show a fuel cartridge in an embodiment of the present invention;

FIG. 2 is a diagram that shows the construction of a fuel cell equipped with the fuel cartridge shown in FIG. 1;

FIG. 5 is a diagram that shows another example of a gas treatment section;

FIG. 6 is a diagram that shows an additional example of a gas treatment section;

FIG. 7 is a schematic diagram that shows an example of an electrical appliance equipped with a fuel cell in an embodiment of the present invention;

FIGS. 10(a) and 10(b) are sectional views schematically show a shutter section;

FIGS. 11(a) and 11(b) are front views of the shutter section of FIGS. 10(a) and 10(b);

FIGS. 13(a) and 13(b) are diagrams that show another example of a fuel cartridge;

FIGS. 14(a) and 14(b) are diagrams that show a fuel cell in an embodiment of the present invention.

BEST MODE FOR CARRYING OUT THE INVENTION

Figure 3:
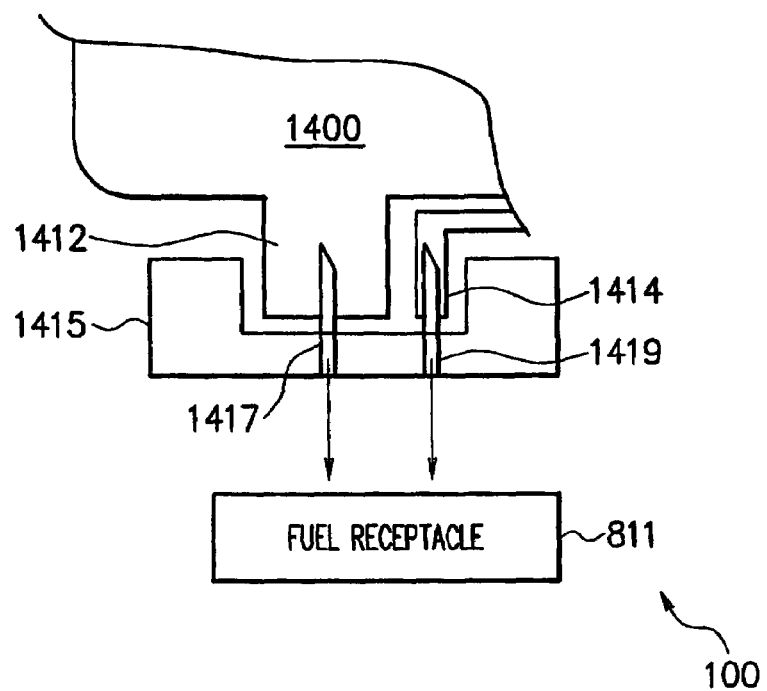
FIG. 3 is a diagram that schematically shows an example of a mounting place of a fuel cartridge in a fuel cell in an embodiment of the present invention.

Embodiments of the present invention are described with reference to the drawings. Incidentally, in all of the drawings, like numerals refer to like components and repetitive detailed descriptions of these components will be omitted accordingly.

A fuel cell in the embodiments of the present invention can be applied to cellular phones, portable personal computers such as a notebook personal computer, personal digital assistants (PDAs), various types of cameras, navigation systems, and small-sized electrical devices such as a portable music reproducing player. A fuel cell in the embodiments is a direct type fuel cell in which liquid fuel is supplied to a fuel electrode. Also, a detachable fuel cartridge is used.

First Embodiment

FIGS. 1(a) and 1(b) diagrammatically show a fuel cartridge in this embodiment.

FIG. 1(a) shows a side sectional view. A fuel cartridge 1400 has a fuel housing section 1402 which houses fuel 124, a pouring port 1412, a gas exhaust pipe 1410, and a gas exhaust port 1414. The fuel housing section 1402 is divided by a partition member 1406 and a gas-liquid separation film 1408 into a liquid housing chamber 1402a and a gas housing chamber 1402b. The gas exhaust pipe 1410 is connected to the gas housing chamber 1402b. The gas housing chamber 1402b is provided with an air intake port 1409 that takes in the air from the outside. Although not illustrated, the air intake port 1409 is provided with a check valve that leads air only from the outside into the fuel cartridge 1400 and prevents gas flow in the reverse direction. As a result, pressure in the fuel housing section 1402 does not decrease and the fuel gas does not flow out from the air intake port 1409.

In this embodiment, the fuel 124 is liquid fuel such as methanol, ethanol, dimethyl ether, other alcohols or liquid hydrocarbons such as cycloparaffin. As the liquid fuel, an aqueous solution can be used.

The gas-air separation film 1408 is, for example, a hydrophobic film made of polyether sulfone, acrylic copolymer or the like. As such a gas-liquid separation film 1408, GORE-TEX (made by Japan Gore-Tex Co., Ltd.), VERSAPORE (made by Nippon Pall Co., Inc.), SUPORE (made by Nippon Pall Co., Inc.) and so on can be cited.

By dividing the fuel housing section 1402 into the liquid housing chamber 1402a and the gas housing chamber 1402b by means of the gas-liquid separation film 1408, when the fuel 124 housed in the liquid housing chamber 1402a vaporizes and becomes fuel gas, the fuel gas passes through the gas-liquid separation film 1408 and is introduced into the gas housing chamber 1402b. The fuel gas that has been introduced into the gas housing chamber 1402b is discharged to the outside of the fuel cartridge 1400 from the gas exhaust port 1414 through the gas exhaust pipe 1410.

Although not illustrated here, the pouring port 1412 and the gas exhaust port 1414 are each provided with a cap so that when the fuel cartridge 1400 is not used, the fuel 124 and the fuel gas do not leak to the outside thereof. A cap of the fuel cartridge 1400 may be made of high-density rubber, a septum and the like. The fuel cartridge 1400 is constructed in such a manner that the liquid fuel can be refilled in the liquid housing chamber 1402a. The liquid fuel can also be introduced from the pouring port 1412 by means of a syringe and the like, and it is also possible to have an introduction port for the liquid fuel on another part.

FIG. 1(b) is a sectional view along line I-I' of FIG. 1(a). The area of the gas-liquid separation film 1408 can be appropriately set based on the concentration and volume of the fuel 124 housed in the fuel cartridge 1400.

FIG. 2 is a diagram that shows the construction of a fuel cell that is equipped with the fuel cartridge 1400. A fuel cell 100 includes a unit cell 101, a fuel receptacle 811 that contains the unit cell 101 and the fuel 124, and a gas treatment section 804. The fuel cartridge 1400 is mounted on a prescribed mounting place of the fuel receptacle 811.

The unit cell 101 includes a fuel electrode 102, an oxidizer electrode 108 and a solid electrolyte film 114 provided between the two. The fuel 124 is supplied to the fuel electrode 102, an oxidizer is supplied to the oxidizer electrode 108, and the unit cell 101 generates power by electrochemical reactions. Although air can usually be used as the oxidizer, oxygen gas may be supplied instead.

The gas treatment section 804 oxidizes the gas generated in the fuel receptacle 811 and converts the gas into carbon dioxide and water, which are discharged to the outside. As a result, it is possible to treat remaining fuel gas and by-products such as formic acid formed during electrochemical reactions into harmless carbon dioxide and to discharge the carbon dioxide to the air. The gas treatment section 804 will be described later.

FIG. 3 is a diagram that schematically shows an example of a mounting place of the fuel cartridge 1400 in the fuel cell 100.

The fuel cell 100 has a cartridge mounting bed 1415, a first hollow needle 1417 attached to the cartridge mounting bed 1415, and a second hollow needle 1419. The first hollow needle 1417 and the second hollow needle 1419 are connected to the fuel receptacle 811.

When the fuel cartridge 1400 is mounted to the cartridge mounting bed 1415, the first hollow needle 1417 and the second hollow needle 1419 pierce the cap of the fuel cartridge 1400. As a result, the liquid housing chamber 1402a (FIG. 1) and gas housing chamber 1402b (FIG. 1) of the fuel cartridge 1400 each are connected to the fuel receptacle 811. Although not illustrated here, it is possible to provide a pump between the cartridge mounting bed 1415 and the fuel receptacle 811, and the fuel 124 in the fuel cartridge 1400 can be supplied to the fuel receptacle 811.

Next, the operation of the fuel cell 100 will be described with reference to FIGS. 1 to 3.

As described above, when the fuel cartridge 1400 is mounted to the cartridge mounting bed 1415, the liquid housing chamber 1402a and the gas housing chamber 1402b each are connected to the fuel receptacle 811 via the first hollow needle 1417 and the second hollow needle 1419, respectively. As the result of this, the fuel 124 housed in the liquid housing chamber 1402a and the fuel gas housed in the gas housing chamber 1402b are introduced into the fuel receptacle 811.

When the fuel cell 100 is activated, gas of formic acid, methyl formate, formaldehyde and the like is generated in the fuel receptacle 811. These gases are recovered along with the fuel gas to the gas treatment section 804 and discharged to the air after being treated in the gas treatment section 804.

In this embodiment, the fuel gas that has been gasified in the fuel housing section 1402 of the fuel cartridge 1400 is discharged from the fuel cartridge 1400 via the gas exhaust pipe 1410 and then housed in the fuel receptacle 811 of the fuel cell 100. Therefore, it is possible to keep the pressure in the fuel cartridge 1400 at an appropriate level. Furthermore, because the fuel gas discharged from the fuel cartridge 1400 is housed in the fuel receptacle 811 of the fuel cell 100, the fuel gas will be liquefied at some temperature in the fuel cell 100 and be used as the fuel 124. Even when the fuel gas is not liquefied, since it is discharged to the air after treated in the gas treatment section 804, any influence on the environment can be reduced.

Figure 4:
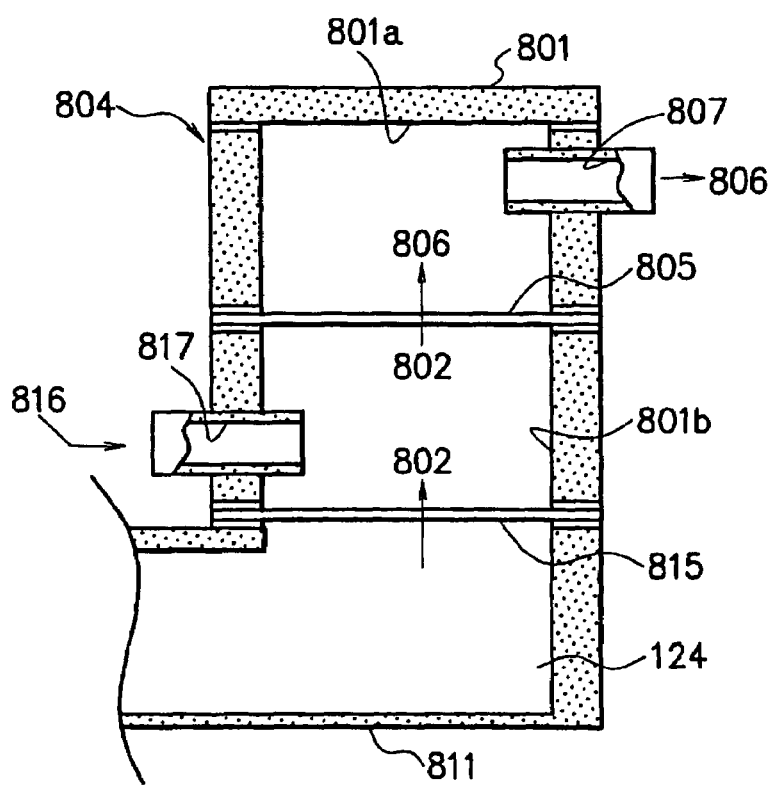
FIG. 4 is sectional view that shows the construction of a gas treatment section.

Next, a detailed structure of the gas treatment section 804 will be described. FIG. 4 is a sectional view that shows the construction of the gas treatment section 804.

The gas treatment section 804 includes a receptacle 801 that collects reaction products, by-products formed during electrochemical reactions in the unit cell 101 and gas 802 such as the remaining fuel gas, and a catalyst layer 805 that is provided within the receptacle 801 and oxidizes the gases collected within the receptacle 801.

The catalyst contained in the catalyst layer 805 is, for example, metals, alloys or their oxides that include at least one selected from the group consisting of Pt, Ti, Cr, Fe, Co, Ni, Cu, Zn, Nb, Mo, Ru, Pd, Ag, In, Sn, Sb, W, Au, Pb and Bi.

In this embodiment, the catalyst layer 805 can be formed by applying the catalyst to a substrate such as a carbon paper. In this case, the catalyst needs to cover only a part of the carbon paper. The catalyst can be supported by carbon particles through an impregnation process, which is generally used. The carbon particles that support the catalyst are, for example, acetylene black (DENKA BLACK (made by Denki Kagaku Kogyo Kabushiki Kaisha), XC72 (made by Vulcan Inc.) or the like), Ketchen Black, carbon nanotube, carbon nanohorn or the like. The catalyst layer 805 can be obtained by dispersing in a solvent the carbon particles that support the catalyst to make paste of the carbon particles, then applying the paste to the substrate and drying the paste. As the substrate, it is possible to use a porous substrate such as a shaped carbon, a sintered body of carbon, a sintered metal, a foamed metal or the like in addition to a carbon paper.

The catalyst layer 805 may take a form where catalysts are supported by a porous metal sheet or the like. A metal fiber sheet may be used as the porous metal sheet. In this case, the metal fiber sheet can be obtained by compression molding of metal fiber or by compression sintering of metal fiber, if necessary.

Also, with etching such as electrochemical etching and chemical etching, fine irregular structures may be formed on the surface of the metal which composes the porous metal sheet. For example, by using plating processes such as electroplating and electroless plating, and evaporation processes such as vacuum evaporation and chemical vapor deposition (CVD), metal that acts as a catalyst can be supported by a porous metal sheet on which the irregular structures are formed.

The fuel cell 100 further includes a gas-liquid separation film 815 that is interposed between the fuel receptacle 811 and the receptacle 801. The gas-liquid separation film 815 can be fabricated from the same material as that of the gas-liquid separation film 1408 (see FIG. 1) of the fuel cartridge 1400.

In the gas treatment section 804, the receptacle 801 is divided by the catalyst layer 805 into an upper chamber 801a and a lower chamber 801b. An exhaust port 807 that discharges treated gas 806 is formed at the upper side of the upper chamber 801a.

In the lower chamber 801b, an oxygen supply port 817 that supplies oxygen 816 is formed, and oxygen 816 is supplied by use of an oxygen supply means, which is not shown in the figure. From the oxygen supply port 817, air that contains oxygen can be supplied instead and other kinds of gas can also be supplied. Since gas is supplied from the oxygen supply port 817, it is possible to cause an air current in the receptacle 801 and to promote discharge of the gas 802 in the receptacle 801 from the exhaust port 807. Though in this embodiment, the oxygen supply means supplies oxygen, it is also possible to exclude the oxygen supply means and simply take in the outside air.

Next, the operation of the gas treatment section 804 will be described.

In the fuel receptacle 811, carbon dioxide is generated at the fuel electrode 102 by the electrochemical reactions of the unit cell 101 and stays in the fuel receptacle 811. A part of alcohol such as methanol that is contained in the remaining fuel 124 evaporates and becomes fuel gas. Furthermore, as described above, the fuel gas generated in the fuel cartridge 1400 is also introduced into the fuel receptacle 811. Thus, by-products such as formic acid (HCOOH), methyl formate (HCOOH₃), formaldehyde (HCOH) may sometimes be generated.

The gas 802 generated in the fuel receptacle 811 is introduced into the receptacle 801 via the gas-liquid separation film 815. The gas 802 collected in the receptacle 801 is oxidized by the catalyst layer 805 as shown by Formulas (4) to (7):

$$CH_3OH + 3/2 O_2 \rightarrow CO_2 + 2H_2O, \quad (4)$$

$$HCOOH + 1/2 O_2 \rightarrow CO_2 + H_2O, \quad (5)$$

$$HCOOH_3 + 2O_2 \rightarrow 2CO_2 + 2H_2O, \quad (6)$$

$$HCOH + O_2 \rightarrow CO_2 + H_2O. \quad (7)$$

As described above, the remaining fuel gas and by-products contained in the gas 802 are oxidized, and carbon dioxide and water are generated. The treated gas 806 thus oxidized is discharged to the outside via the exhaust port 807. The oxidation of the gas 802 by the catalyst layer 805 can be promoted by supplying oxygen 816 from the oxygen supply port 817.

FIG. 5 is a diagram that shows another example of the gas treatment section 804.

In this example, the gas treatment section 804 includes a catalyst 835 in wire wool form. The catalyst 835 fills the exhaust port 807 provided at the upper part of an exhaust passage 831.

In this embodiment, the catalyst 835 in wire wool form can be the same metal, alloy or their oxides contained in the catalyst layer 805 described in FIG. 4.

As described above, the catalyst 835 can take any shape so long as it is formed so as to be able to oxidize the gas 802 discharged from the fuel receptacle 811. For example, it is possible to use a net of wires made of the above metal, alloy or other oxides, and the catalyst 835 can be used in the shape of wire.

Furthermore, the gas treatment section 804 can further include a heating section 841 as shown in FIG. 6. The heating section 841 may be a heater, for example, and it is preferred that the heating section 841 be arranged in the exhaust passage 831 to heat an area near the catalyst 835. In this way, it is possible to efficiently and positively oxidize the gas 802 adhering to the catalyst 835. Also, the heating section 841 may be provided around the exhaust passage 831 or may take in the gas 802 from the exhaust passage 831, heat the gas 802 and then return it to the exhaust passage 831. Also, the heating section 841 may heat the oxygen supplied from the oxygen supply port 817 to supply the heated oxygen. As a result, the oxidation of the gas 802 by the catalyst 835 can be promoted.

Although this treatment by the heating section can be constantly performed during the treatment of the gas 802 discharged from the fuel receptacle 811, it is also possible to periodically perform this treatment after a certain period of time of the operation of the fuel cell. After the fuel cell 100 operated for a long time, components that could not be oxidized and components that have liquefied may sometimes adhere to the catalyst 835, resulting in decrease of the efficiency of oxidation. In such cases, the oxidizing function of the catalyst 835 can be returned to an original condition by efficiently removing the gas 802 that have adhered to the catalyst 835. This enhances the durability of the catalyst 835.

As described above, because the fuel cell 100 in this embodiment has the gas treatment section 804, it is possible to discharge the fuel gas from the fuel cartridge 1400 and the gas generated in the fuel cell 100 after oxidizing treatment. This reduces the influence on the environment and improves the maintainability and reliability of the fuel cell.

FIG. 7 is a schematic diagram which shows an example of an electrical appliance equipped with the fuel cell described above. The electrical appliance in this embodiment is a portable personal computer. A portable personal computer 210 is provided with a fuel cell 100 at the bottom part thereof, and a fuel cartridge 1400 is mounted to the back part thereof. In this embodiment, the fuel cartridge 1400 is provided with a gas-liquid separation film 1408. Therefore, even when the fuel cartridge 1400 is attached to the portable personal computer and slanted while it is carried or during the operation of the computer, the liquid fuel does not leak from the fuel cartridge 1400 and it is possible to improve the operability.

Second Embodiment

Figure 8:
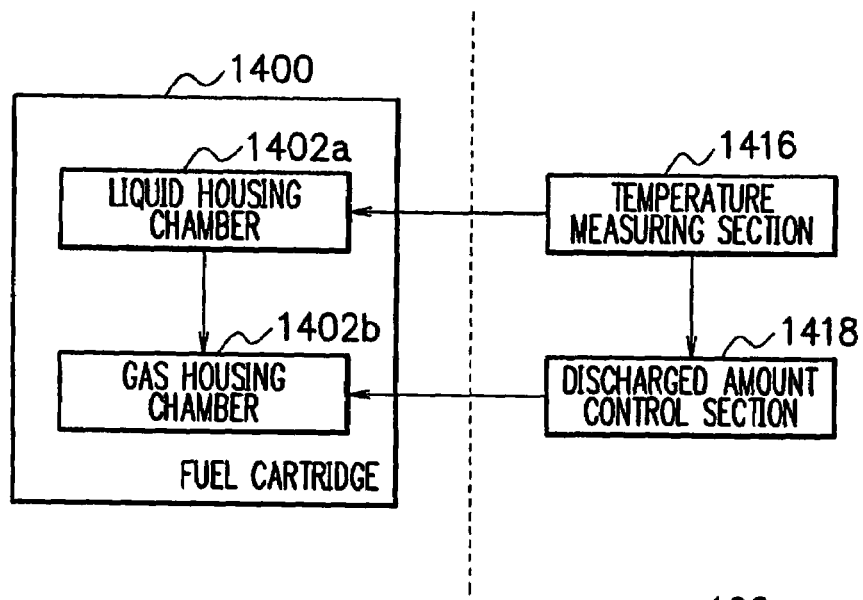
FIG. 8 is a block diagram that shows the construction of a fuel cell in an embodiment of the present invention.

FIG. 8 is a block diagram which shows the construction of a fuel cell 100 in this embodiment. The fuel cell 100 in this embodiment controls an amount of fuel gas discharged from a fuel cartridge 1400.

The fuel cell 100 further includes a discharged amount control section 1418 that controls an amount of the fuel gas discharged from a gas housing chamber 1402b and a temperature measuring section 1416 that measures the temperature of a liquid housing chamber 1402a.

Figure 9:
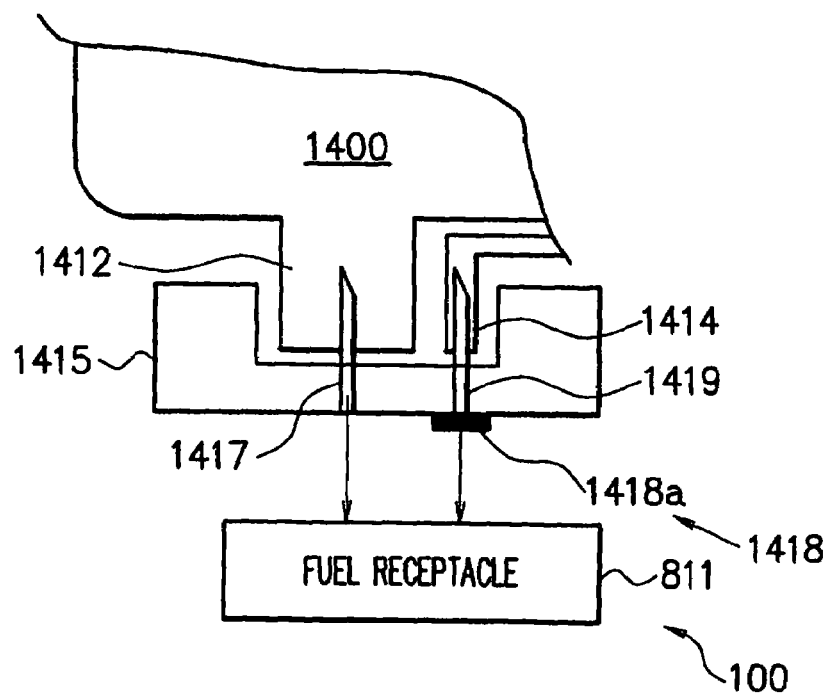
FIG. 9 is a diagram that schematically shows an example of a mounting place of a fuel cartridge in a fuel cell in an embodiment of the present invention.

As shown in FIG. 9, the discharged amount control section 1418 includes a shutter 1418a that opens and closes a communication area between the second hollow needle 1419 and the fuel receptacle 811. The second hollow needle is connected to the gas discharge port 1414 of the fuel cartridge 1400. The discharged amount control section 1418 controls the opening and closing of the shutter 1418a based on the temperature of the liquid housing chamber 1402a that is measured by the temperature measuring section 1416. As a result, an amount of the fuel gas discharged from the gas housing chamber 1402b is controlled.

For example, when the temperature of the liquid housing chamber 1402a rises, the pressure in the fuel cartridge 1400 increases. In this case, the discharge amount control section 1418 increases the opening of the shutter 1418a. As a result, an amount of the fuel gas discharged from the gas housing chamber 1402b increases and the pressure in the fuel cartridge 1400 can be adjusted to an appropriate level. On the other hand, when the temperature of the liquid housing chamber 1402a is low, the pressure in the fuel cartridge 1400 is low. In this case, the discharged amount control section 1418 decreases the opening of the shutter 1418a.

Also, the discharged amount control section 1418 may close the shutter 1418a when the fuel cell 100 is not operated and open the shutter 1418a when the fuel cell 100 is activated.

As shown in FIGS. 10(a) and 10(b) and 11(a) and 11(b), a shutter section 1420 may be provided on the gas-liquid separation film 1408 of the fuel cartridge 1400 so that the degree of exposure of the gas-liquid separation film 1408 is controlled based on the temperature. FIGS. 10(a) and 10(b) are sectional views that schematically show a slide type shutter, and FIGS. 11(a) and 11(b) are front views of the slide type shutter of FIGS. 10(a) and 10(b). FIGS. 10(a) and 11(a) each show the shutter in a closed state, and FIGS. 10(b) and 11(b) each show the shutter in an open state. A case where the gas-liquid separation film 1408 of the fuel cartridge 1400 is rectangular is shown here as an example.

The shutter section 1420 includes an aeration plate 1011, and a closure portion 1012 that opens and closes slits of the aeration plate 1011. The size of the aeration plate 1011 is almost equal to that of the gas-liquid separation film 1408.

In the shutter section 1420, the closure portion 1012 is connected to a rod via a rotary support shaft, which is not shown. The closure portion 1012 abuts on the aeration plate 1011 when the rod is driven forward by a linear motor, and the closure portion 1012 departs from the aeration plate 1011 when the rod is moved backward by the linear motor. As a result, the slits of the aeration plate 1011 are opened and closed and the degree of exposure of the gas-liquid separation film 1408 is controlled. The rotary support shaft, rod, linear motor and the like may be provided on the main body of the fuel cell 100, and they may work in conjunction with the shutter section 1420 of the fuel cartridge 1400 when the fuel cartridge 1400 is mounted.

Figure 15:
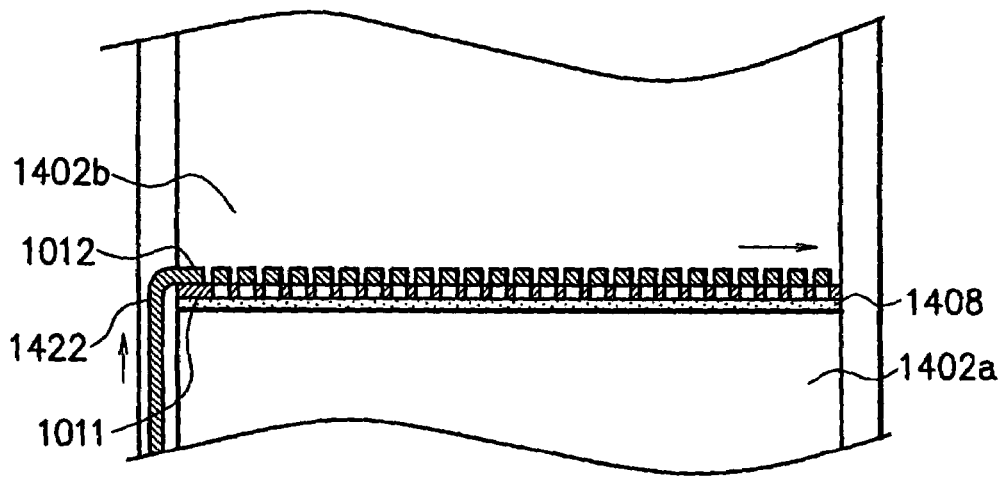
FIGS. 15(a)-15(c) are diagrams that show another example of a shutter section.
Figure 15:
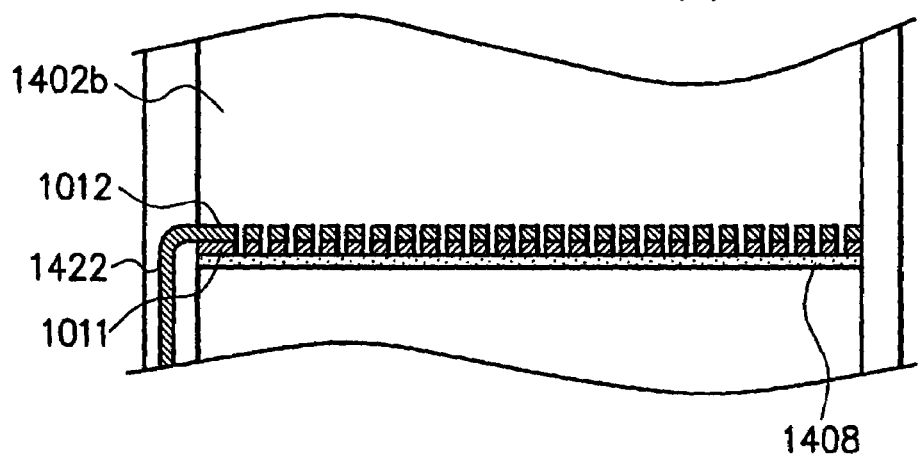
Figure 15C:
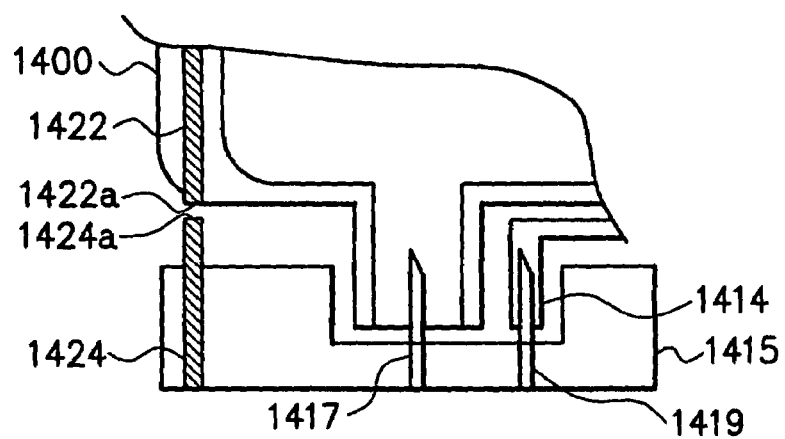

FIGS. 15(*a*)-15(*c*) are diagrams that show another example of the shutter section 1420.

In this example, slits of the aeration plate 1011 are opened and closed by sliding the closure portion 1012. FIG. 15(*a*) shows the shutter portion when the slits of the aeration plate 1011 are closed, and FIG. 15(*b*) shows the shutter portion when the slits of the aeration plate 1011 are opened. A movable belt 1422 that slides the closure portion 1012 is connected to the closure portion 1012.

FIG. 15(*c*) shows mechanism to move the closure portion 1012. The above-described movable belt 1422 is housed in a sidewall of the fuel cartridge 1400. A leading end part 1422*a* of the movable belt 1422 is connected to a leading end part 1424*a* of the movable belt 1424 on the main body side provided in a cartridge mounting bed 1415. The movable belt 1422 on the main body side is connected to a motor provided in the main body of the fuel cell and moves up and down by the driving of the motor. As a result, as shown in FIGS. 15(*a*) and 15(*b*), the closure portion 1012 moves and the slits of the aeration plate 1011 are opened and closed.

Figure 12A:
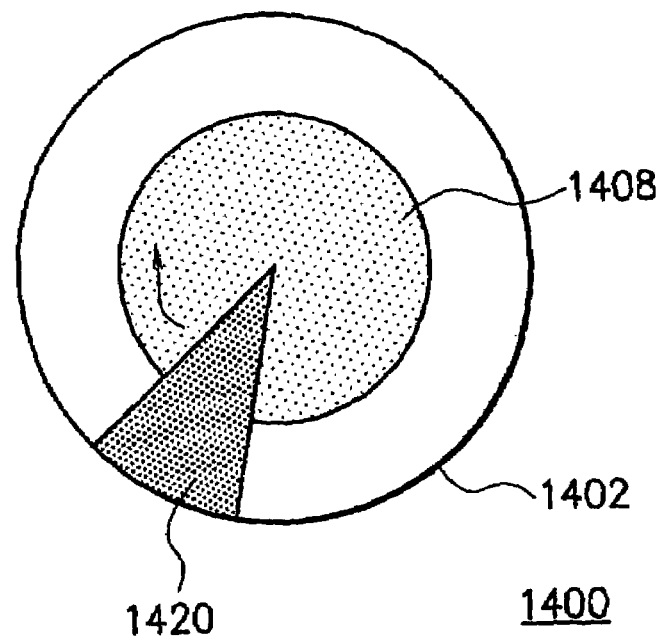
FIGS. 12(a) and 12(b) are diagrams that show another example of a shutter section.
Figure 12B:
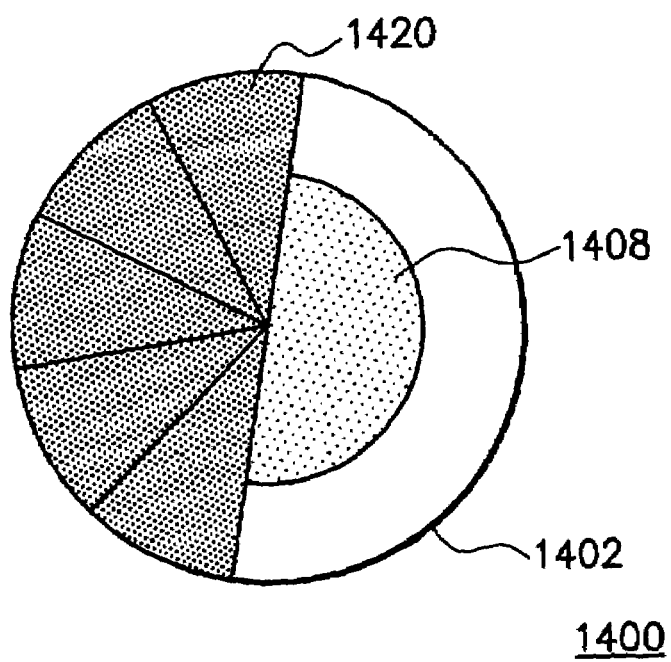

FIGS. 12(*a*) and 12(*b*) are diagrams that show another example of the shutter section 1420. When the gas-liquid separation film 1408 is circular, the shutter section 1420 may include multiple closure fans. FIG. 12(*a*) shows the shutter portion in an open state and FIG. 12(*b*) shows the shutter portion in a closed state. As shown in FIG. 12(*a*), when the shutter is opened, the closure fans gathered above or under one closure fan. When the shutter is closed, the multiple closure fans are spread and the surface of the gas-liquid separation film 1408 is covered with the shutter. Although FIG. 12(*b*) shows half of the gas-liquid separation film 1408 is covered, the whole surface of the gas-liquid separation film 1408 may be covered.

For example, when the temperature of the fuel cartridge 1400 is high, the pressure in the fuel cartridge 1400 becomes high. Therefore, as shown in FIG. 12(*a*), the discharged amount control section 1418 increases the opening of the shutter section 1420 to ensure that the liquid fuel in the liquid housing chamber 1402*a* is easily discharged to the gas housing chamber 1402*b*. On the other hand, when the temperature of the fuel cartridge 1400 is low, as shown in FIG. 12(*b*), the discharged amount control section 1418 can reduce the opening of the fuel housing section 1402.

In the above example, a description was given of a case where the discharged amount control section 1418 controls an amount of the fuel gas discharged from the fuel cartridge 1400 based on the temperature of the fuel cartridge 1400 measured by the temperature measuring section 1416. However, the opening and closing of the shutter 1418*a* and the shutter section 1420 can also be performed by the on-off operation of a switch that is made of a material whose shape changes with temperature. Bimetal, shape-memory alloys, thermal expansion agents, springs, temperature-sensitive ferrite or the like can be used as the material whose shape changes with temperature.

FIGS. 13(*a*) and 13(*b*) are diagrams that show a fuel cartridge 1400 where a shutter 1411 is provided on a gas exhaust pipe 1410. The opening and closing of the shutter 1411 is controlled by bimetal. As shown in FIG. 13(*a*), the shutter 1411 closes communication between the gas housing chamber 1402*b* and the gas exhaust pipe 1410 when the temperature is lower than a reference temperature. As shown in FIG. 13(*b*), the shutter 1411 opens communication between the gas housing chamber 1402*b* and the gas exhaust pipe 1410 when the temperature becomes higher than a reference temperature.

As described above, the fuel cell 100 in this embodiment has mechanism that controls an amount of the fuel gas discharged from the fuel cartridge 1400. For this reason, even when the pressure in the fuel cartridge 1400 changes with temperature, it is possible to keep the pressure in the fuel cartridge at an appropriate level by controlling an amount of the fuel gas discharged from the fuel cartridge 1400.

Third Embodiment

FIGS. 14(*a*) and 14(*b*) are diagrams that show a fuel cell 100 in this embodiment.

In this embodiment, a fuel cartridge 1400 is connected directly to a gas treatment section 804, and a fuel gas that vaporizes in the fuel cartridge 1400 is discharged to the outside via a gas-liquid separation film 815 of the gas treatment section 804.

As shown in FIG. 14(*a*), the fuel cell 100 includes multiple unit cells 101, a fuel receptacle 811 provided for the multiple unit cells 101, and a fuel cartridge 1400 that supplies fuel 124 to the fuel receptacle 811 and recovers the fuel 124 that has circulated through the fuel receptacle 811. The fuel receptacle 811 and the fuel cartridge 1400 are connected to each other via a fuel passage 854 and a fuel passage 855. A gas treatment section 804 is provided on the fuel passage 855.

In this embodiment, the fuel 124 is supplied to the fuel receptacle 811 via the fuel passage 854. The fuel 124 flows along multiple partition walls 853 provided in the fuel receptacle 811 and is supplied in sequence to the multiple unit cells 101. The fuel 124 that has circulated through the multiple unit cells 101 is recovered in the fuel cartridge 1400 via the fuel passage 855. In the figure, the arrows indicated by a solid line show the flow of the liquid fuel and the arrows indicated by a broken line show the flow of gas.

As shown in FIG. 14(*b*), in the fuel cell 100 of this embodiment, a take-in port 858 of the receptacle 801 is connected to an opening 856 of the fuel passage 855 via the gas-liquid separation film 815 to ensure that gas 802 flows into the receptacle 801 from the fuel passage 855 via the gas-liquid separation film 815. It is ensured that the fuel gas generated in the fuel cartridge 1400 also flows into the receptacle 801. Incidentally, the receptacle 801 may be detachable from the fuel passage 855.

The gas 802 collected in the receptacle 801 is oxidized by a catalyst layer 805, made harmless, and discharged to the air from an exhaust port 807 of the receptacle 801.

The present invention has been described above on the basis of the embodiments. It will be understood by those skilled in the art that these embodiments are illustrative only and that various modifications are possible and such modifications are within the scope of the present invention. Such modifications will be described below.

In the above embodiments, descriptions were given of cases where the fuel gas discharged from the gas exhaust port 1414 of the fuel cartridge 1400 is introduced into the gas treatment section 804 via the fuel receptacle 811. However, the fuel cell 100 may have a pipe that introduces the fuel gas discharged from the gas exhaust port 1414 into the gas treatment section 804. Namely, the fuel gas discharged from the gas exhaust port 1414 is discharged directly to the gas treatment section 804.

The fuel gas recovered in the gas housing chamber 1402b may be discharged directly from the fuel cartridge 1400 instead of being recovered to the main body of the fuel cell 100. In this case, it is preferred that gas treatment mechanism such as a catalyst be provided at the gas exhaust port 1414 of the fuel cartridge 1400.

In the second embodiment, the description was given of a construction in which the fuel cell 100 has mechanism that controls an amount of the fuel gas discharged from the fuel cartridge 1400 based on temperature. However, the fuel cell 100 may include a pressure sensor. In this case, the discharged amount control section 1418 controls the opening of the shutter based on the pressure in the fuel cartridge 1400 that is detected by the pressure sensor.

The invention claimed is:

1. A fuel cartridge that houses liquid fuel, comprising:
   a liquid fuel housing chamber having a fixed volume;
   a gas housing chamber;
   a gas-liquid separation film that separates from each other liquid fuel in the liquid fuel housing chamber and fuel gas in the gas housing chamber, which fuel gas comprises vaporized liquid fuel and allows passage of fuel gas from the liquid fuel housing chamber to the gas housing chamber;
   a shutter that adjusts a degree of exposure of the gas-liquid separation film; and
   a temperature dependent controller for adjusting the shutter based on a temperature in the liquid fuel housing chamber.

2. The fuel cartridge according to claim 1, further comprising a discharge port that discharges the fuel gas separated by the gas-liquid separation film to the outside of the fuel cartridge gas housing chamber.

3. The fuel cartridge according to claim 2, further comprising a discharged amount controller that adjusts an amount of the fuel gas discharged from the discharge port based upon a pressure in the gas housing chamber.

4. A fuel cartridge that houses liquid fuel, comprising:
   a fuel cartridge mounting adapted to detachably mount the fuel cartridge to a fuel cell for introduction of liquid fuel into a fuel receptacle in a fuel cell;
   a liquid fuel housing chamber having a fixed volume;
   a gas housing chamber;
   a gas-liquid separation film that separates from each other liquid fuel in the liquid fuel housing chamber and fuel gas in the gas housing chamber, which fuel gas comprises vaporized liquid fuel and allows passage of fuel gas from the liquid fuel housing chamber to the gas housing chamber;
   a shutter that adjusts a degree of exposure of the gas-liquid separation film; and
   a temperature dependent controller for adjusting the shutter based on a temperature in the liquid fuel housing chamber.

5. The fuel cartridge according to claim 4, further comprising:
   a discharge port that discharges the fuel gas from the fuel gas housing chamber into the fuel cell fuel receptacle.

6. The fuel cartridge according to claim 5, further comprising a discharged amount controller for controlling an amount of the fuel gas discharged from the discharge port based upon a temperature in the liquid housing chamber.

* * * * *